Dec. 29, 1931.  L. E. RUSSELL ET AL  1,838,500
TRUNK RACK FOR AUTOMOBILES
Filed March 14, 1931   2 Sheets-Sheet 2

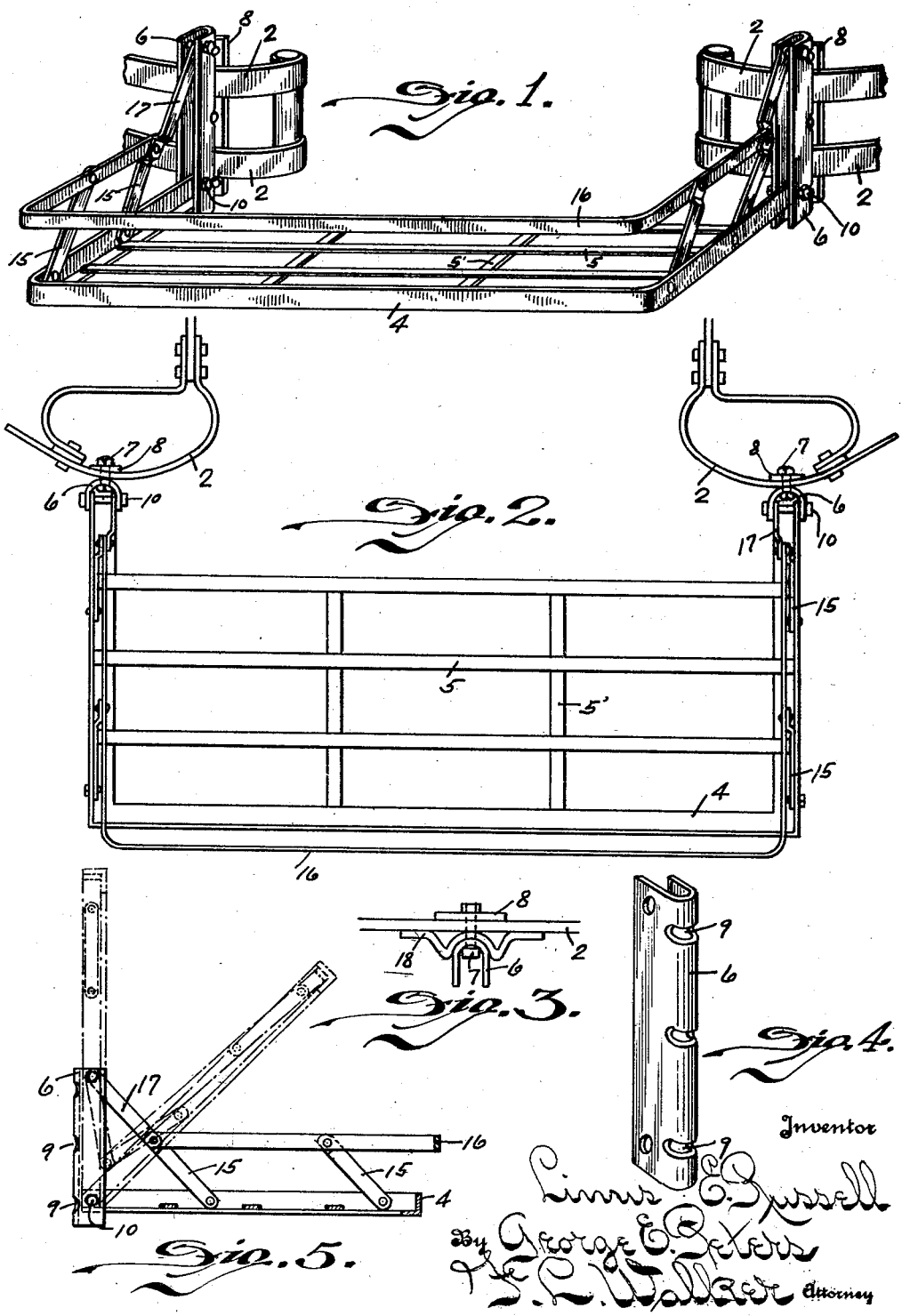

Patented Dec. 29, 1931

1,838,500

UNITED STATES PATENT OFFICE

LINUS E. RUSSELL AND GEORGE E. PETERS, OF SPRINGFIELD, OHIO

TRUNK RACK FOR AUTOMOBILES

Continuation of application Serial No. 431,107, filed February 25, 1930. This application filed March 14, 1931. Serial No. 522,660.

This invention relates to luggage or article carriers, and more particularly to a collapsible trunk rack to be mounted upon a motor vehicle or the like.

The trunk rack forming the subject matter hereof is mounted for vertical swinging movement into inoperative or retracted position and embodies an upstanding guard rail which is automatically erected as the trunk rack swings downwardly to its operative or extended position and which is retracted into the plane of the rack as the latter swings upwardly.

While the present form of trunk racks may be applied to any suitable portion of the vehicle chassis, for illustrative purposes it has been shown in the drawings as applied to the rear bumper or fender construction which in the present instance is illustrated as two spaced bumperettes.

The supporting brackets of the present trunk rack construction are of universal character whereby they are applicable to supporting surfaces which may be angularly disposed relative to the axis of oscillation of the rack and relative to each other. This enables the supporting brackets of the rack to accommodate themselves to differently inclined supporting surfaces of the vehicle chassis or the bumper bars.

The object of the invention is to simplify the structure as well as the means and mode of operation of vehicle luggage carriers whereby they will not only be cheapened in construction but will be more efficient in use, positive in operation, uniform in action, capable of being easily and quickly applied to existing vehicles and unlikely to get out of repair.

A further object of the invention is to provide improved mounting brackets for the luggage carrier having universal application to supporting surfaces of different contour. This enables the carrier to be secured not only to surfaces in a common or parallel plane but also to surfaces which may be inclined relative to each other or to curved surfaces such as the rear faces of the bumper structure.

A further object of the invention is to provide an improved form of upstanding guard rail and means for automatically collapsing the rail into the frame of the rack as the latter is retracted and for automatically erecting the guard rail by the extension of the rack into operative position.

With the above primary and other incidental objects in view as will more fully appear in the specification, the invention consists of the features of construction the parts and combinations thereof and the mode of operation, or their equivalents, as hereinafter described and set forth in the claims.

Referring to the accompanying drawings wherein is shown the preferred but obviously not necessarily the only form of the embodiment of the invention, Fig. 1 is a perspective view of the assembled trunk rack or luggage carrier forming the subject matter hereof, applied to the bumperettes of a motor vehicle. Fig. 2 is a top plan view thereof. Fig. 3 is a detail view of a modification of the universal supporting connection. Fig. 4 is a detail perspective view of one of the supporting brackets for universal application to either flat, inclined or curved supporting surfaces.

Fig. 5 is a side elevation showing the trunk rack in its extended, retracted and partially retracted positions. Figs. 6 and 7 are a top plan view and a side elevation respectively of a modification of the trunk rack illustrated in Figs. 1 to 3 wherein the guard rail is retracted exteriorly of the tray instead of interiorly thereof, the frame of the rack or tray being preferably though not necessarily formed of channel bar material. Fig. 8 is a detail side elevation of a modified relation of the link connection for automatically operating the guard rail. Fig. 9 is a detail view of a modification of the supporting bracket.

Like parts are indicated by similar characters of reference throughout the several views.

Referring to the drawings, 2—2 indicates the rear bumper of a motor vehicle, which to illustrate the universal adaptability of the rack to arcuate supporting surfaces have been shown as bumperettes.

The tray or carrier comprises a substantially U shaped frame 4 preferably though not necessarily formed from angle bar stock, the parallel arms of which are interconnected by transverse parallel spaced slats or bars 5—5, which bars are transversely connected with each other and with the medial or rear portion of the frame 4 by other slats or bars 5'. The bars 5 and 5' are united with each other and with the U shaped angle bar frame 4 by electric welding which is the preferred and economical method although they may be connected by riveting.

The tray thus formed is mounted for vertical swinging movement upon a pair of supporting brackets engageable with any suitable or convenient portion of the vehicle structure. In the present instance these supporting brackets comprise vertically disposed U shaped channel bars 6. These channel brackets 6 are provided at spaced intervals with transverse slots 9 to receive clamp bolts 7 having operative engagement with clamp plates 8 at the opposite side of the bumper bars. The transverse slots 9 are so located that the clamp bolts 7 protruding therefrom may extend above, between and below the level of the bumper bars 2. It is not necessary that all of these slots be employed. If the bumper construction is of the bumperette type as illustrated in Fig. 1 of the drawings, clamp bolts may be employed in the two terminal slots 9 of the channel bracket, while if it is desired to set the rack or carrier at a higher or lower level, the medial slots 9 and either one or the other of the terminal slots of the channel bracket 6 may be employed. If desired the structure may be supported upon a single bumper bar only. The transverse slots 9 are elongated to enable a reasonable range of rocking or tilting movement of the channel shaped bracket 6 relative to the supporting surface. The clamp bolts 7 will extend perpendicularly to the supporting surface of the bumper or other structure at the point of contact of a bracket channel 6 and will likewise extend radially relative to the curved bearing face of the channel bracket. However the channel bracket may be shifted relative to the clamp bolt 7 in either direction through a partial rotary or rocking motion to aline the supporting brackets 6 at the opposite sides of the rack or carrier in parallelism. Ordinarily the channel brackets are assembled in parallelism upon the trunk rack or carrier to which they are pivoted upon trunnion bolts 10 and the clamp bolts 7 are capable of transverse adjustment relative to the channel shaped brackets 6 within the elongated slots 9 into positions perpendicular with the supporting surface of the bumper bar or other structure at the points of contact of the supporting brackets 6 therewith. This construction affords a universal adaptability whereby the supporting brackets 6 are applicable to differently inclined or curved surfaces. The clamp bolts 7 secure these channel brackets 6 firmly and rigidly to the supporting structure. The side arms of the frame bar 4 of the tray or carrier being pivoted upon the trunnion bolts 10 to the lower ends of the channel shaped supporting brackets 6 are capable of swinging upwardly to a vertical position parallel with the channel shaped supporting brackets 6 into the channels of which the side arms of the frame will enter.

Connected in parallel relation with the tray or carrier is a U shaped guard rail 16 which is adjustably interconnected with the tray or rack at opposite sides thereof by swinging links 15 pivoted at their upper ends to the guard rail 16 and at their lower ends to the side arms of the U shaped rack or tray frame 4. A further swinging link 17 is pivotally connected at its upper end to the upper extremity of each channel shaped supporting bracket 6 and at its lower end is pivotedly engaged with the guard rail 16. These swinging links 17 are preferably though not necessarily pivoted to the guard rail 16 concentrically with the connection of the upper ends of one pair of the swinging links 15. The swinging links 15 impart to the guard rail 16 a parallel movement inwardly or toward the pivotal axis of the carrier as the tray or rack swings upwardly about its trunnions 10. This movement of the guard rail 16 is induced by the link 17 which in its relation with the forward link 15 forms a toggle and which forces the guard rail toward the tray or rack as the latter swings upwardly. The parallel shifting movement of the guard rail 16 relative to the tray will bring the rear side of the guard rail interiorly of the angle bar frame 4 of the tray as the latter reaches its final retracted or upstanding position. Thus the guard rail 16 is nested interiorly of the tray with the guard rail 16 and its connecting links 15 and 17 confined within the plane of the tray. When in extended position the links 17 and the coacting links 15 form a diagonal suspension brace for the tray or carrier.

In Figs. 6 and 7 there is shown a modification wherein the frame 4 of the tray or carrier comprises a channel bar disposed with its recessed side outermost. The U shaped guard rail 16 in this construction is so proportioned and disposed that upon retractive movement of the rail by the upward swinging movement of the rack or tray, the parallel shifting movement of the guard rail will seat the rear portion of such rail within the channeled recess of the rack frame 4. The construction, arrangement and operation of this modified construction is quite similar to that heretofore described and illustrated in the preceding figures of the drawings except that in the later construction as illustrated in Figs. 6 and 7, the side arms of the guard rail are more widely spaced than those of the tray or rack frame 4 and hence extend exteriorly of the rack frame when retracted.

It is to be understood that whatever the inclined or angular position of the supporting surface of the bumper or other structure may be, the rounded face of the channel shaped bracket bar will always find a firm contact engagement therewith. Due to the elongation of the transverse slots 9 of the bracket channel, the clamp bolts 7 may assume any angular position relative thereto necessary to conform to the engaged portion of the vehicle to which the bracket is to be attached. While not essential, a channeled socket plate 18 may be interposed between the convex bracket bar 6 and the supporting structure shown as in Fig. 5. The concave recess of the plate 18 forms a seat within which the convex face of the bracket is received, the parts being capable of relative rocking motion to accommodate the bearing plate to the angle of the supporting surface.

The construction thus described affords a comparatively inexpensive carrier rack for luggage, universally applicable to vehicles of different design and different style. It is capable of being easily and quickly applied to the vehicle without the necessity for special tools and as shown in the drawings will readily accommodate itself to different dimensions and different shapes of bumper structure regardless of the inclination or curvature thereof. The provision of the marginal rail 16 insures the safety of the baggage or trunk carried upon the rack by preventing it from being jolted from the rack in transit. By retracting the guard rail into the plane of the tray or carrier either interiorly of the frame as shown in Figs. 1 to 3 or by seating it in an exterior channel or seat as shown in Fig. 7, the guard rail and its connections are firmly held against vibration, thereby preventing rattle or clatter.

The present construction is a further development and amplification of the retractable trunk rack construction illustrated and described in our copending application Serial No. 431,107, filed Feb. 25, 1930, now Patent No. 1,796,580, issued March 17, 1931, of which the present application is a continuation.

In Fig. 8 there is shown a modification wherein the interconnections of the links 15 and 17 with the guard rail 16 are slightly offset relative to each other, the link 17 being preferably, though not necessarily, connected rearwardly of the link 15. This relation of the pivotal points prevents the link 15 moving beyond dead center relation upon the initial erecting movement, and more particularly prevents any tendency of the forward end of the guard rail to collapse downwardly when the rear end of the rail is subjected to upward pull by straps used to secure the luggage. Under such condition one of the pivotal connections will act as a fulcrum and the other as a stop to prevent tilting motion about such fulcrum. While not essential, the attachment bolts 7 are preferably formed with T shaped heads insertable through the transverse slots 9 in the brackets 6 and engaged therein by a partial rotation, as is shown in Fig. 9.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modification within the legitimate and valid scope of the appended claims.

Having thus described our invention, we claim:

1. The combination with a luggage carrier mounted for vertical swinging motion, of supporting brackets therefor to which the carrier is pivoted including a vertical bar having a transversely convex face for engagement with a supporting member and bolts connecting the bar with the supporting member in any one of several tangential positions.

2. The combination with a luggage carrier mounted for vertical swinging motion, of supporting brackets therefor to which the carrier is pivoted, said brackets having convex faces for contact engagement with a supporting structure in different tangential positions and connection bolts having universal connection with the brackets.

3. The combination with a luggage carrier mounted for vertical swinging motion, of a guard rail therefor disposed in substantially parallel relation thereabove when the carrier is extended, and adjustably connected thereto, and means for automatically retracting the guard rail by the adjustment of the carrier to a position interiorly of the carrier.

4. The combination with a luggage carrier mounted for vertical swinging motion, a guard rail disposed in substantially parallel relation thereabove when the carrier is extended, parallel swinging links connecting the guard rail and carrier, a bracket member to which the carrier is pivoted, and pivoted links swingingly connecting the adjacent ends of the guard rail with said bracket in spaced relation with the pivotal connection of the carrier.

5. A supporting means for a luggage carrier or the like comprising a vertically disposed attachment member having a convex bearing face for engagement in different tangential positions with a supporting surface and attachment bolts engaging therewith and capable of transverse adjustment to different radial positions relative to the attachment member.

6. In an adjustable luggage carrier therefor, a supporting bracket including a member having a convex face for contact engagement with a supporting surface, attachment bolts connected thereto for shifting movement transversely of said member into perpendicular relation with a supporting surface tangential to the convex face of the member.

7. A supporting bracket of the character described, including a channel bar having a convex face for contact engagement with a supporting surface, and having transverse slots in such convex face for the reception of anchor bolts extending substantially perpendicular to the supporting surface, said slots permitting a limited range of rocking adjustment of the channel bar relative to the contact surface.

8. A supporting bracket of the character described, including an attachment member having a convex face for contact engagement with a supporting member, attachment bolts connecting said attachment member to the supporting member, the bolts being variably connected to the attachment member to enable a rocking adjustment of the said member relative to the supporting member about an axis concentric with its convex face.

9. The combination with a luggage carrier pivotally mounted for vertical swinging motion and supporting means therefor, of a guard rail disposed in elevated relation above the carrier when the latter is extended, and yieldingly connected with the carrier, and operative connections for transmitting to the guard rail a retractive movement toward the pivotal connection of the carrier simultaneously with the swinging movement thereof.

10. In a swinging luggage carrier, a supporting bracket, a rack pivoted to the bracket for vertical swinging motion, a guard rail located in substantially parallel spaced relation above the rack and movable toward and from the rack, and duofunctional means actuating the guard rail in its movement toward and from the rack and limiting the swinging movement of the rack.

11. The combination with a vehicle bumper bar structure of a carrier rack, and mounting brackets for said carrier rack having convex faces engaging the rear face of the bumper bar structure and clamp means for securing said brackets thereto.

12. The combination with a bumper bar structure of a carrier rack mounted thereon, supporting brackets therefor comprising U shaped channel members disposed transversely of the bumper bars with their convex faces in contact with the rear faces thereof, clamp members disposed at the opposite side of the bumper bars and bolts connecting the U shaped brackets and clamp members, the brackets and bolts being relatively adjustable whereby the brackets and bumper bars may be engaged in different tangential positions.

13. The combination with a bumper bar structure of a carrier rack mounted thereon, supporting brackets therefor comprising U shaped channel members disposed transversely of the bumper bars with their convex faces in contact with the rear faces thereof, the convex faces of the brackets being transversely slotted, clamp bolts extending through the slots and transversely adjustable therein for clamping the brackets to the rear face of the bumper bar structure in any one of several tangential positions.

14. The combination with a bumper bar structure of a carrier rack mounted thereon, supporting brackets therefor comprising U shaped channel members disposed transversely of the bumper bars with their convex faces in contact with the rear faces thereof, the U shaped brackets being transversely slotted, and substantially T shaped clamp bolts the heads of which are insertable through said slots and engageable interiorly of the brackets by a subsequent partial rotation, and clamp members with which the bolts cooperate to clamp the brackets to the near faces of the bumper bars in any one of several tangential positions.

15. In a luggage carrier, a swinging rack, supporting brackets to which the rack is pivoted for vertical swinging movement, a guard rail disposed in spaced position above the rack and movable toward and from the rack, retractible interconnections between the guard rail and rack, and swinging links connecting the guard rail with the supporting brackets at points in elevated spaced relation with the guard rail whereby the adjustment of the swinging rack into extended position will be limited by said links.

16. In a luggage carrier, a swinging rack, supporting brackets to which the rack is pivoted for vertical swinging movement a guard rail disposed in spaced position above the rack and movable toward and from the rack, swinging links operatively connected with the guard rail and with the rack and by their swinging motion compensating for the movement of the guard rail toward and from the rack, and upwardly inclined links operatively connected with the guard rail and with the supporting brackets at elevated points above the level of the guard rail when extended, said last mentioned links serving to actuate the guard rail into erected and retracted relation with the rack simultaneously with the swinging movement of the latter.

17. In a luggage carrier, a swinging rack, supporting brackets to which the rack is pivoted for vertical swinging movement a guard rail disposed in spaced position above the rack and movable toward and from the rack, swinging links operatively connected with the guard rail and with the rack and by their swinging motion compensating for the movement of the guard rail toward and from the rack, and upwardly inclined links operatively connected with the guard rail and with the supporting brackets at elevated points above the level of the guard rail when extended, said last mentioned links serving to limit the swinging movement of the rack into extended position.

18. In a luggage carrier, a swinging rack, a guard rail therefor automatically movable toward and from the rack, guiding means maintaining the rack in substantially parallel relation with the rack throughout its range of relative movement, supporting brackets, and actuating means connecting the guard rail and supporting brackets to automatically effect the movement of the rail simultaneously with the swinging movement of the rack, and further adapted to arrest the rack at the limit of its range of movement.

19. In a luggage carrier, a swinging rack, a guard rail therefor automatically movable toward and from the rack, guiding means maintaining the rack in substantially parallel relation with the rack throughout its range of relative movement, said guiding means further imparting to the guard rail a shifting movement in the direction of its extent whereby the guard rail when retracted will effect seating engagement upon the marginal portion of the rack, and actuating means for the guard rail operated by the swinging motion of the rack.

20. In a luggage carrier, a swinging rack having therein an exteriorly grooved marginal frame, a guard rail therefor automatically movable toward and from the rack, actuating connections for said guard rail operated by the swinging motion of the rack, and guide means for the rail by which the rail is guided into the exterior marginal groove of the rack frame when retracted.

21. In a luggage carrier, a swinging rack including a marginal frame, a guard rail therefor automatically movable toward and from the rack, actuating connections for the guard rail operated by the swinging movement of the rack, and guiding means for the rail by which the rail is guided into a position interiorly of the marginal frame of the rack when retracted.

In testimony whereof we have hereunto set our hands this 3rd day of March, A. D. 1931.

LINUS E. RUSSELL.
GEORGE E. PETERS.